(12) United States Patent
Wiltshire

(10) Patent No.: US 9,939,780 B2
(45) Date of Patent: *Apr. 10, 2018

(54) HOLOGRAPHIC FILM WITH FIRST AND SECOND TRANSLUCENT PHOTOSENSITIVE RECORDING LAYERS

(71) Applicant: BOWATER HOLOGRAPHICS (MALTA) LIMITED, Gzira (MT)

(72) Inventor: John David Wiltshire, Colchester (GB)

(73) Assignee: Bowalter Holographics (Malta) Limited, Gzira (MT)

(*) Notice: Subject to any disclaimer, the term of this patent is extended or adjusted under 35 U.S.C. 154(b) by 360 days.

This patent is subject to a terminal disclaimer.

(21) Appl. No.: 14/341,751

(22) Filed: Jul. 25, 2014

(65) Prior Publication Data

US 2015/0009546 A1 Jan. 8, 2015

Related U.S. Application Data

(63) Continuation of application No. 12/900,589, filed on Oct. 8, 2010, now Pat. No. 8,817,348.

(30) Foreign Application Priority Data

Oct. 9, 2009 (GB) .................................. 0917698.3

(51) Int. Cl.
*G03H 1/02* (2006.01)
*G03H 1/22* (2006.01)

(52) U.S. Cl.
CPC ............ *G03H 1/0248* (2013.01); *G03H 1/02* (2013.01); *G03H 1/2249* (2013.01); *G03H 2001/026* (2013.01); *G03H 2001/0264* (2013.01); *G03H 2001/2263* (2013.01); *G03H 2240/55* (2013.01); *G03H 2260/12* (2013.01); *G03H 2260/16* (2013.01)

(58) Field of Classification Search
CPC ...... G03H 1/02; G03H 1/0212; G03H 1/0248; G03H 1/0252; G03H 2001/2263; G03H 2001/2268; G03H 2001/2271; G03H 1/26; G03H 2001/2605; G03H 2001/261; G03H 2001/2615; G03H 1/2645; G03H 2001/0415; G03H 2001/0417
USPC .................. 359/3, 1, 4, 7, 8, 22, 24, 32, 35; 369/103; 427/162; 430/1, 2
See application file for complete search history.

(56) References Cited

U.S. PATENT DOCUMENTS 8,817,348 B2 * 8/2014 Wiltshire ................. G03H 1/02
359/22

* cited by examiner

*Primary Examiner* — Arnel C Lavarias
(74) *Attorney, Agent, or Firm* — Hamilton, DeSanctis & Cha

(57) ABSTRACT

Various holographic films for recording multicolor volume holograms, especially full color volume reflection holograms, and to manufacturing techniques for such film, and to corresponding methods of recording multicolor and full-color volume, in particular volume reflection holograms. We describe a holographic film for recording a multicolor volume hologram, the film including: a carrier; a first photosensitive recording layer sensitive to one or both of red and green laser light; and a second photosensitive recording layer sensitive to blue laser light. Both the first and second photosensitive recording layers include silver halide and have a grain size of less than 30 nm, and at least one of the photosensitive recording layers has a thickness of greater than 3 μm and less than 5 μm.

8 Claims, 4 Drawing Sheets

HOLOGRAPHIC FILM WITH FIRST AND SECOND TRANSLUCENT PHOTOSENSITIVE RECORDING LAYERS

CROSS REFERENCE TO RELATED APPLICATION

The present application is a continuation of U.S. patent application Ser. No. 12/900,589 entitled "Holographic Film and Recording Method" and filed Oct. 8, 2010 by Wiltshire. The aforementioned application claims priority to British Patent Application No. GB0917698.3 entitled "Holographic Film and Recording Methods", and filed Oct. 9, 2009. The entirety of each of the aforementioned applications is incorporated herein by reference for all purposes.

BACKGROUND OF THE INVENTION

This invention relates to holographic film for recording multicolor volume holograms, especially full color volume reflection holograms, and to manufacturing techniques for such film, and to corresponding methods of recording multicolor and full-color volume, in particular volume reflection holograms.

Volume reflection holograms utilize the principle of Bragg diffraction. An interference pattern created in the zone of intersection between a diffuse object beam and a coherent reference beam from the same laser, in the form of a standing wave, is recorded in a high-resolution "volume" recording material. Planar interference "fringes" are thus created in the form of refractive index modulation within the depth of the recording material.

This resembles the method used by Lippmann in the early part of the last century to create photographs with color effects at a time when conventional photography was restricted to "black and white" reconstruction of a scene.

This 'volume reflection hologram' phenomenon occurs when the orientation of the recording material, with respect to the position of the interference pattern, means that the alternate planes of high and low intensity caused by constructive and destructive interference, intersect the recording material in such a way that they are predominantly parallel with its surface in one plane.

The planar fringe structure, in the form of refractive index modulation, resembling alternate pages of a book, forms a dielectric wavelength selective reflector. Individual fringe planes in the form of alternate high and low index layers in the volume of the emulsion are spaced at half-wavelength intervals throughout the depth of the recording layer.

Light of a wavelength corresponding to twice the fringe spacing of the grating will be reflected, since its waves reflected from a first layer will interfere constructively with light from the next layer. Light of other wavelengths will interfere destructively and thus no sum reflection occurs.

In a transmission hologram, these fringes are predominantly perpendicular to the surface with the resulting creation of a linear fringe structure which has given rise to the concept of surface relief holograms which form the basis of the embossed hologram industry. In this case diffraction is in the form of a dispersive action which means light is diffracted at an angle in accordance with its wavelength, and thus these holograms have a quite different appearance to those under discussion in this document, since they have the familiar "rainbow" color appearance.

In the case of silver halide recording material, the fringe recording comprises layers of high refractive index component in the form principally of redistributed silver bromide whose pure crystalline form has an index of 2.23, interspersed with lower index planes of gelatin with index as low as approximately 1.5.

The degree of "index modulation" $\Delta\eta$, is responsible for controlling the efficiency of the reflectivity of these individual layers, i.e. the higher the reflectivity of each, the lower the number of planes necessary to achieve the desired diffraction efficiency of the hologram.

In the case of photopolymer recording material, the necessary index modulation is achieved by the mobility of the molecules of monomer compound which polymerize into a high index areas in microscopic zones of the fringe structure at positions where constructive inference between the hologram object and reference beams results in high intensity radiation; thus catalyzing polymerization of the monomer. Other functional systems are feasible in terms of chemical technology but the common factor is that light exposure is in some way leading to index modulation of the layer.

Manufacturers such as Pilkington (St.Asaph, N. Wales) have utilized thick emulsion to produce holographic optical elements for the purpose of "head-up displays" for fighter aircraft to enable a pilot to have a simultaneous view of his instrument panel with an otherwise unattenuated view through the screen. Only light of the very specific single wavelength of the panel illumination is reflected by the hologram in this case, so that almost all the natural light coming from outside the screen is attenuated from his view of the scene outside the cockpit, unlike the action of say a semi-silvered mirror element, which would reflect the panel light equally well, but would seriously reduce the brightness of the view of the exterior with obvious consequences.

In an image hologram for decorative, archival, or security purposes, however there is less desire for monochromaticity, especially since there may be a general desire to reflect light of a larger bandwidth, especially in the case of holograms for the former and latter purposes, in order to utilize as much of the available ambient light as possible to assist the casual viewer. As a result, the manufacturers of commercial silver halide materials, such as Agfa Gevaert with their Holotest materials, have generally coated their emulsion at a thickness of 7-8$\mu$.

Workers such as Hans Bjelkhagen (Centre for Modern Optics, De Montfort University) have used a mixed (white) laser beam to illuminate an object in the "Denisyuk" mode of reflection holography wherein a spread and filtered white laser beam is incident upon a high resolution silver halide recording plate such as those provided by Slavich. Positioned close behind the recording plate is an object which is typically a valuable artifact such as a ceramic urn or vase etc. Laser light passing directly through the plate, including that scattered forward by the slightly opalescent emulsion, is incident upon the object and is then reflected as a diffuse wavefront predominantly back towards the recording emulsion such that it interferes with the incoming 'reference' beam to create a standing wave of interference, provided that the object and the whole optical system is absolutely stationary.

The standing wave of interference is basically a complex structure of alternate planes of high and low intensity illumination, which result from constructive and destructive interference between the object and reference beams travelling in predominantly opposite directions.

The recording plate is able to make an image of this interference pattern throughout its surface and depth. After development, the resulting fringe pattern will resemble the pages of a book with alternate high and low density of silver, nominally with a sinusoidal transverse profile. A recording of phase information, unlike the amplitude recording method of a conventional photograph, does not normally bear a visual relationship to the subject matter, whose appearance is only reconstructed when a suitable beam of light is incident upon the plate after processing is complete.

Typically the emulsion is then treated with a bleach solution which is able to change the black silver amplitude recording into a translucent phase structure wherein the standing wave originally recorded is represented by a refractive index modulation such that little of the incident light is absorbed or attenuated, but much of it is refracted by the grating.

Bjelkhagen has carried out a great deal of research published in his book "Silver Halide Emulsions for Holography and their Processing" in an attempt to find chemical means to provide improvements to the diffraction efficiency of the holograms made in this process.

The concept of diffusion transfer refers to the bleaching mechanism where silver ions are created by oxidation of developed silver metal and then encouraged by their environment to combine with a bromide ion and deposit themselves upon a local undeveloped emulsion crystal, thus transferring material from one zone to leave a density void whilst increasing the mean refractive index of the neighboring zone.

To date, recording material producers such as Fuji Hunt, Slavich and Color Holographic and have taken the approach of sensitizing their emulsion with a range of spectral sensitizers so as to create a homogeneous photosensitive layer capable of reacting to exposure by lasers of wavelengths suitable to create recordings. These have been referred to as "panchromatic" films but in photographic terminology this term is usually used to describe materials which allow the balanced recording of all of the natural colors in a scene.

In a color holography system intended to record light from three specific monochromatic laser sources, spectral sensitizers can be incorporated with narrow band sensitivity peaks designed to coincide with the lasers without the need to design an overlap to enable sensitivity to all colors. So we could actually term the holographic material as "polychromatic" rather than "panchromatic". A multilayer material for a color hologram is described in EP0562839.

Hence, for at least the aforementioned reasons, there exists a need in the art for advanced systems and methods for addressing problems relating to full color holographic image reproduction.

BRIEF SUMMARY OF THE INVENTION

This invention relates to holographic film for recording multicolor volume holograms, especially full color volume reflection holograms, and to manufacturing techniques for such film, and to corresponding methods of recording multicolor and full-color volume, in particular volume reflection holograms.

According to a first aspect of the invention there is therefore provided a holographic film for recording a multicolor volume hologram, the film comprising: a carrier; a first photosensitive recording layer sensitive to one or both of red and green laser light; and a second photosensitive recording layer sensitive to blue laser light.

Red and green color components may be recorded in the first layer, and blue in the second layer but, alternatively, a red color component may be recorded in the first layer and green and blue color components in the second layer. Still further a green color component may be recorded in the first layer and red and blue color components in the second layer, for example where the blue wavelength is a fraction of the red wavelength so that at least some of the "red" and "blue" fringes coincide (by way of illustration, it can be seen that this would occur where one wavelength is twice the other, but in general a ratio of n/m, where n and m are integers, may also achieve this result, at least partially).

A number of experimental tests have been performed and it has been observed that there are surprising advantages in diffraction efficiency when red and green color components are combined in the first recording layer and a second different layer is employed to record a blue color component of the hologram.

Suitable example wavelengths for red, and/or green and/or blue color components are as follows: red: greater than 600 nm (for example 633 nm); green: between 500 nm and 600 nm (for example 561 nm); blue: less than 500 nm (for example 490 nm).

In embodiments the first and second photosensitive recording layers comprise silver halide, and in this case the silver halide may have a grain size of less than 30 nm, for example of around 20 nm to reduce Rayleigh scattering in the emulsion. Blue-sensitive emulsion may have such a grain size but in embodiments of the holographic film the red/green sensitive layer also has a similarly small grain size to facilitate recording of red/green and blue layers in a single, multi-layer holographic emulsion. In other embodiments one or both of the first and second recording layers may comprise photo polymer recording material, which can be considered as essentially grainless. In this context it will be appreciated that recording for phase imaging (holography) is different to amplitude imaging of conventional film.

Surprisingly it has been found experimentally that relatively thin layers of photosensitive recording material may be employed, for example less than 7 μm, 6 μm, or 5 μm; in embodiments the film has a minimum thickness of greater than 2 μm or 3 μm. Experimentally it has been found that the brightness of the hologram (corresponding to diffraction efficiency) rises substantially when a thickness of 4-5 μm is reached; it is generally desirable, in particular in the case of silver halide which is expensive, to employ thin recording layers and this range appears to be the practical minimum. In some embodiments the film has a relatively low optical density at the wavelengths of use, for example less than 0.5, 0.4, 0.3, 0.2 or 0.1.

In some embodiments the blue-sensitive layer is on top of the red-green sensitive layer (with the carrier underneath), but this is not essential.

In some embodiments the sensitivities of the first and second recording layers are substantially non-overlapping. Thus in embodiments the sensitivity of one layer at a peak of the other is less than 20%, 10%, 5%, 2% or 1% of the peak sensitivity of the other. More particularly, the sensitivity of a red-green sensitive layer may be less than 20% that of the blue sensitive layer at a blue laser wavelength; the sensitivity of the blue layer at a red laser wavelength may be less than 5%, 2% or 1% that of the red-green sensitive layer at the red laser wavelength.

In embodiments three photosensitive recording layers may be employed, one sensitive to each of the three primary colors, red, blue and green.

The invention further provides a method of manufacturing a holographic film, in particular of the type described above, for recording a multicolor volume hologram, in which the first and second photosensitive recording layers are deposited (in either order) onto the carrier.

In a further related aspect the invention provides a method of recording a multicolor image into a volume hologram in a holographic film, said holographic film comprising a plurality of different layers, the method comprising: recording one or both of a red color component and a green color component of said image into a first layer of said holographic film sensitive to one or both of red and green laser light; and recording a blue color component of said image into a second different layer of said holographic film sensitive to blue laser light.

In various embodiments the multicolor image is a full color (red, green and blue) image; and may be recorded into a volume reflection hologram. In one or more embodiments of the method the color components are recorded simultaneously by simultaneously illuminating the film with lasers of the appropriate red/green/blue colors ("white" laser light).

In a still further aspect the invention provides a method of recording a full color volume reflection hologram, the method comprising reducing fringe crowding by recording different color components of said hologram simultaneously in different layers of said volume reflection hologram, to increase diffraction efficiency.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

This invention relates to holographic film for recording multicolor volume holograms, especially full color volume reflection holograms, and to manufacturing techniques for such film, and to corresponding methods of recording multicolor and full-color volume, in particular volume reflection holograms.

Figure 1:
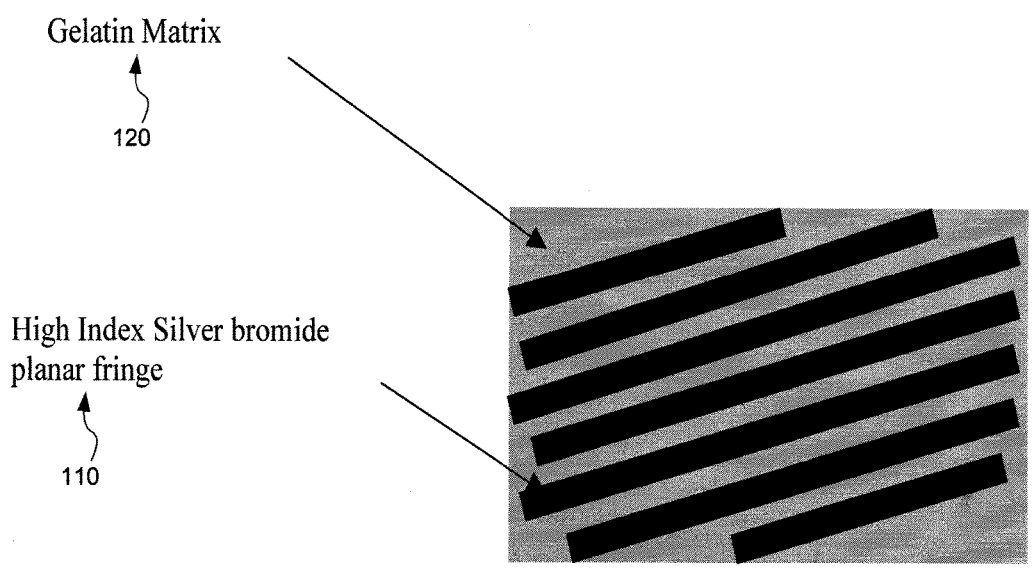
FIG. 1 shows a schematic representation of a monochromatic reflection hologram.

Consider a simple case first: In a monochromatic reflection hologram, the simplest case, the sinusoidal distribution of intensity converted to silver density in a film, created by the recording of a simple interference between two coherent beams can simplistically be schematically represented as in FIG. 1, where the black fringes (e.g., high index silver bromide planar fringe 110) represent high refractive index zones in the layer, whose optical density contrasts with the lower index zones of the remaining volume of the matrix (e.g., gelatin matrix 120).

The effects of system contrast $\gamma$ can influence the profile of the fringe structure, and it must be borne in mind that in a silver halide material the resolution capabilities are absolutely critical since, unusually to photographic applications the crystal size itself is a considerable fraction of the wavelength.

Silver bromide crystals of approximately 20 nm diameter may be used to record fringes of 250 nm spacing. Unless attention is paid to the precise details of the processing chemistry, development can easily result in the formation of metallic silver species far larger than the original emulsion crystal. Problems such as this mean that special techniques are used to keep close control over all aspects of the processing of holography materials. However skilled holographers are familiar with such restrictions which would not normally exist when dealing with ordinary photographic materials based upon conventional silver halide technology.

The bleaching process if uncontrolled can then result in the creation of even larger agglomerates, until both the effective resolution and the scatter level of the level are incompatible with the needs of holography, especially where the recording and reconstruction of blue light is involved.

Figure 2:
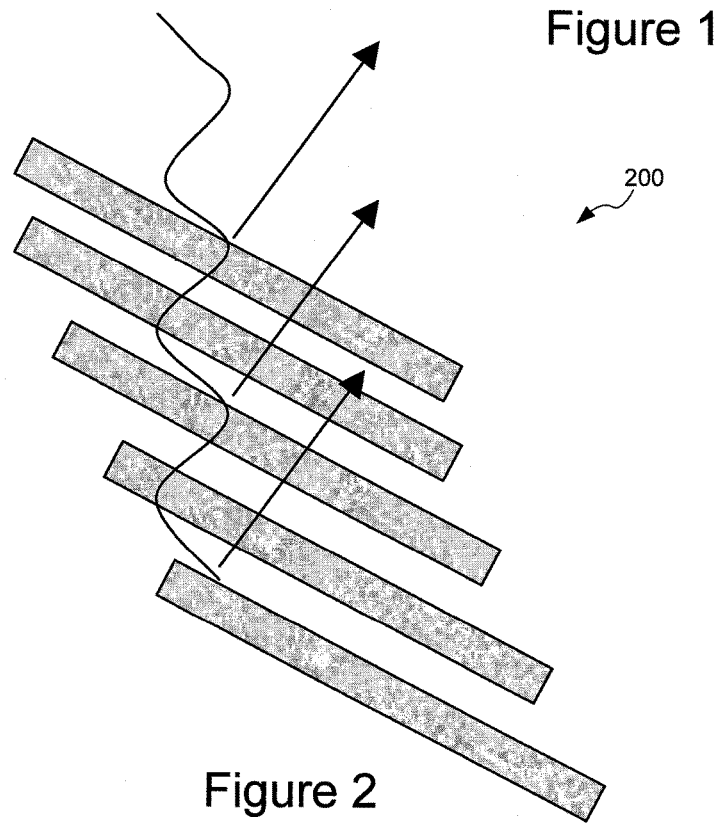
FIG. 2 shows a translucent phase structure of an emulsion hologram.

FIG. 2 shows a translucent phase structure 200 wherein the standing wave originally recorded is represented by a refractive index modulation such that little of the incident light is absorbed or attenuated, but much of it is refracted by the grating.

With ultra fine grain silver halide, dichromated gelatin, or photopolymer recoding materials, it is a relatively simple matter with properly controlled processing techniques to produce reflection gratings of very high diffraction efficiency when a single laser wavelength is utilized. Reflection from index modulated planes is in phase only when fringe spacing is equal to half the wavelength of the incident light. Light of other wavelengths interferes destructively.

In principle, such a monochromatic reflection grating may approach 100% efficiency in a narrow band of wavelengths. In order to influence the system to create very high diffraction efficiency, it is favorable to use a "thick" emulsion, for example 20 micron thick. This has the secondary consequence of reducing the range of wavelengths reflected, making a highly color-selective mirror.

Our own experience has shown that material with a coated thickness as low as 4μ is capable of producing very bright holograms provided the optical system and processing chemistry are optimized.

Image holograms will, in general, suffer in terms of diffraction efficiency from the fact that the holographic recording of a diffuse wavefront involves a complex geometry whereby the diffuse object or artwork effectively comprises an infinite number of point sources which each give rise to a fringe component recording, resulting in a complex microstructure which is difficult to record efficiently, and furthermore is complicated by the existence of the speckle phenomenon resulting from the granularity of the object itself.

As a result the linear, one-bit representation of the fringe structure used in the diagrams herein is a much-simplified schematic of an actual phase microstructure, but is nevertheless a meaningful demonstration of the principles involved for the purpose of this description of some embodiments the invention.

As described in the introduction, previous workers have increased the range of spectral sensitivity of the recording layer by adding sensitizing dyes which enable the photosensitivity to extend to light from a range of lasers. However, when one considers the creation of multicolor recordings in a single layer as described above, a new problem arises.

The superimposition of a number of separate grating structures, especially those of different frequencies, leads to a situation in the film layer where, since each individual structure comprises no more than an index modulation effect, in other words a variation in the optical density within the layer; the transfer of material from zone to zone, when associated with information overload, will lead to areas within the layer, where various fringes associated with the component colors recorded within the layer, adjoin or overlap one another. This phenomenon thus leads to excessively large zones of high refractive index material, which are not associated with corresponding low index planes, and the interfaces which give rise to the reflective properties of the grating become sparse, with the result that overall diffraction efficiency is reduced.

Figure 3:
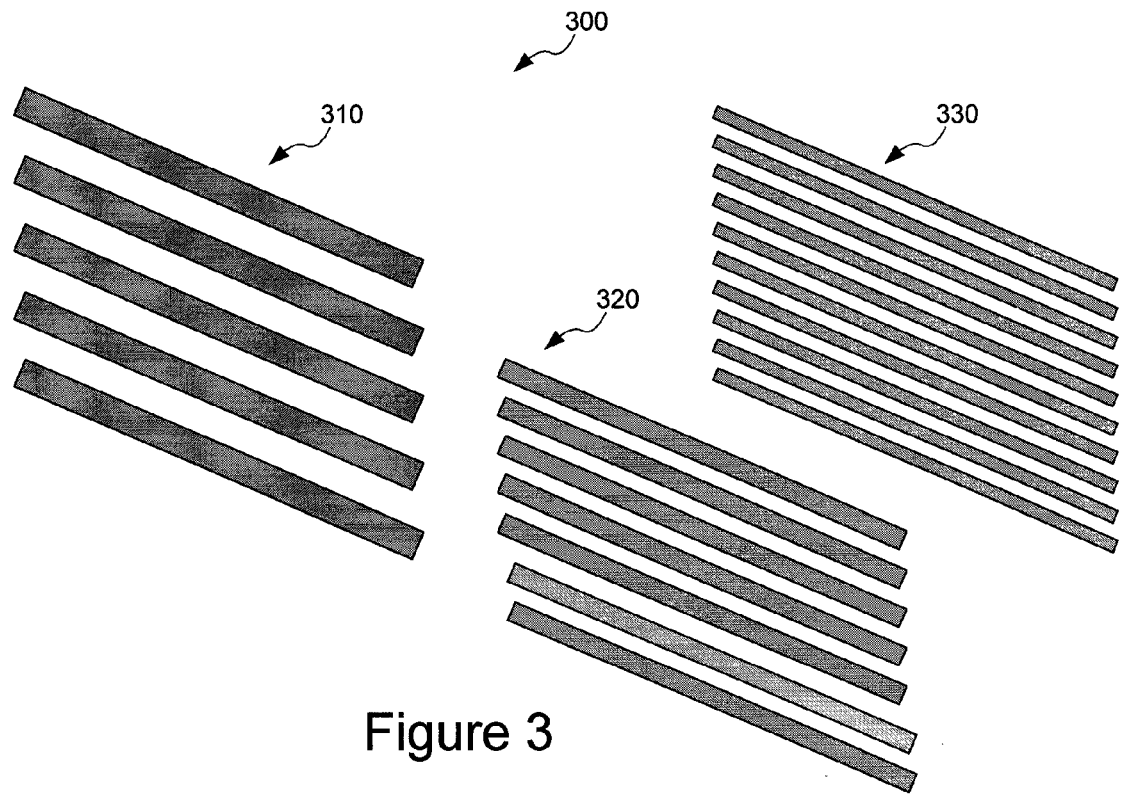
FIG. 3 shows a schematic diagram of three independent fringe structures associated with three different wavelengths of light.

FIG. 3 shows a schematic 300 of three independent fringe structures 310, 320, 330 of varying frequency of the type we might expect to result from the use of three independent lasers to make gratings which would reflect red, green and blue light. Whereas these are differentiated for clarity by the use of varying grey scales, there is no reason to believe that individual fringes associated with red, green and blue recording or diffraction have refractive indices which are dissimilar.

The problem of overloading the film with too many high index zones as described above is clearly demonstrated by FIGS. 4 and 5.

Figure 4:
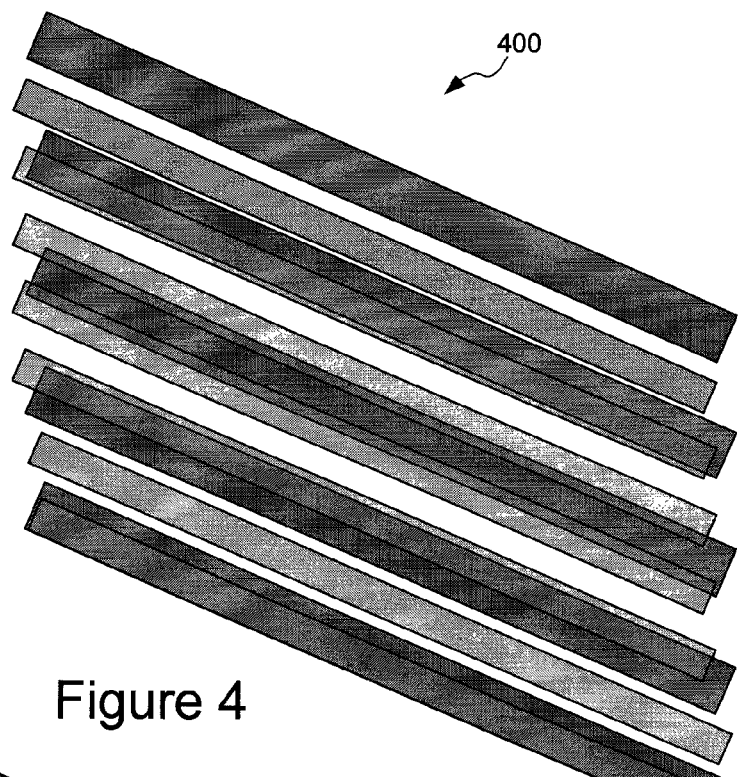
FIG. 4 shows the superimposition of two separate diffracting structures.

In FIG. 4 we see a superimposition 400 of two separate structures associated with, for example, green and red. Whereas some of the index modulation interfaces are lost in this configuration, there remain a large number of planes which correspond with boundaries between high and low index material. The structure has dielectric properties which are suitable to render it a highly reflective hologram as regards both of the original color components.

In practical terms we find it relatively simple to produce a twin color grating of high diffraction efficiency with respect to both color components. It is relatively simple also to assess the loss of diffraction efficiency connected with the incorporation of more than one individual grating into a single layer. But when we produce these multicolor recordings, a combined grating of red and green components for example, is capable of diffraction efficiency close to that associated with separate recordings.

Figure 5:
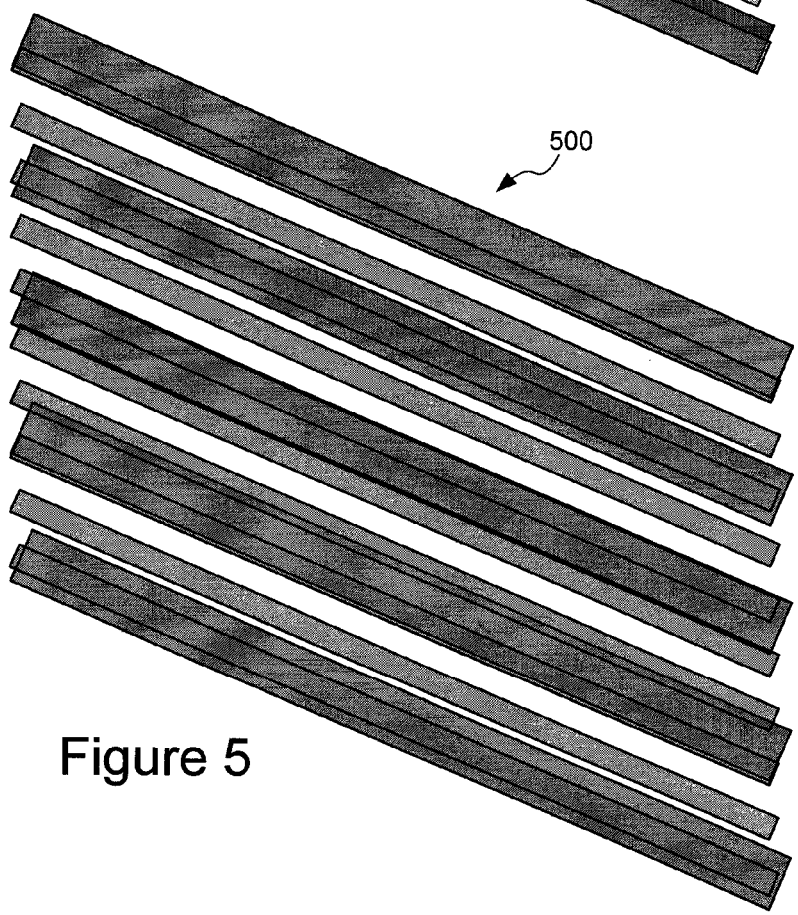
FIG. 5 illustrates loss of diffraction efficiency when a third, shorter wavelength diffracting structure is added.

However, when we incorporate a further exposure to the film intended to produce reflectivity to a third color, the schematic representation 500 of FIG. 5 shows how an acute lack of interfaces between high and low index zones is suddenly apparent with the effect that diffraction efficiency plummets to an unsatisfactory level.

Figure 6:
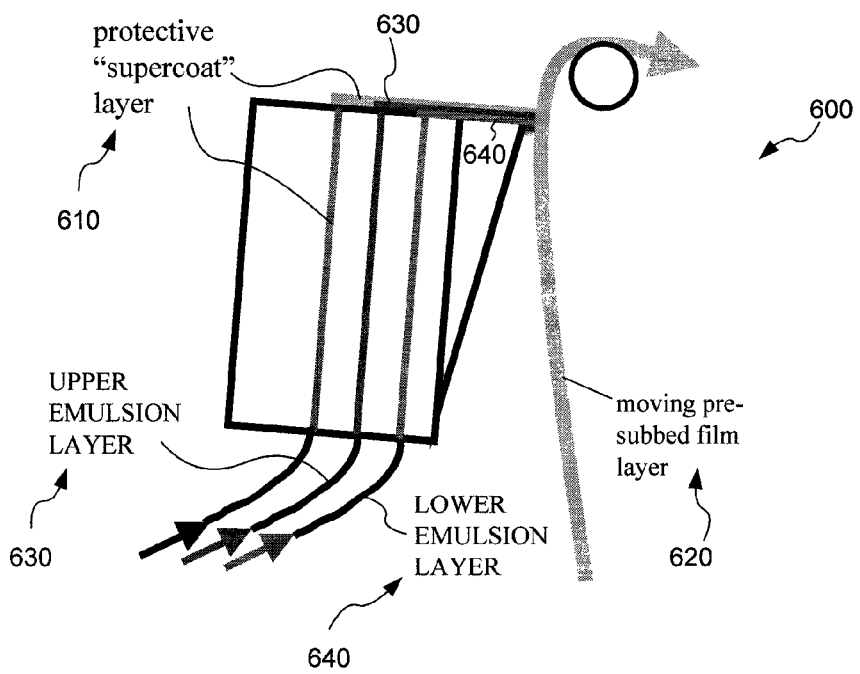
FIG. 6 shows apparatus for manufacturing holographic film according to an embodiment of the invention, and the manufactured film.

It is common in photographic technology to coat multi-layer recording materials. In color photography, the various layers are sensitive to the individual colors. This is facilitated by the ability at the coating stage to influence the surface tension of aqueous gelatin based photo-emulsions principally by the simple addition of additional surfactant (wetting agent) to some of the component layers. As a result these layers, despite their basic common property as an aqueous gelatin solution, and apparent chemical compatibility and apparent miscibility, it is possible to achieve simultaneous multi-layer coating onto film in a single pass of a coating device. This type of process is described by authors such as G. Duffin "Photographic Emulsion Chemistry" and Mees and James "The Theory of the Photographic Process". A metal coating die 600 is machined with slots as shown in FIG. 6 each of which is individually supplied with gelatin emulsion from a pumping system. The separate emulsions, when reaching the head of their feed slot, will run across the tilted block towards the moving pre-subbed film layer 620, which will take up the gelatin coating, again without mixing the individual layers which have their own surface tension properties which prevent a readiness for the layers to combine. The upper most layer 610 in FIG. 6 contains no silver halide, since it is a protective "supercoat" layer, whose primary function is to protect the layer from mechanical damage. The under layers (e.g., upper emulsion layer 630 and lower emulsion layer 640) are both silver halide containing layers which are each spectrally sensitized to a different area of the visible spectrum.

Because we have the ability in holography, unlike in conventional photography, to select recording lasers with some flexibility, provided we retain frequency latitude appropriate for tri-stimulus perception of the final image reconstruction, we are able to actively match the spectral sensitivity of our recording film with the frequency of the individual lasers.

Unlike the need in panchromatic photography to match the natural spectrum of a scene, a holographer could theoretically make a photographic recording of a subject and process its image with a laser of a different color, using chemical processing manipulation of the holographic layer to return the image to a suitable selected color at the last stage in the process. Compare the parallel situation where methods used in embossed holography, where the limitation upon suitably actinic recording materials dictates that blue lasers are used to record all color image components.

With this available flexibility of the spectral sensitivity and the imaging wavelengths it is relatively easy to ensure that sensitizing dyes are selected such that there is little crossover between the chromatic sensitivity of the layers of the recording material. This means that, unlike in the photographic method where image components of a wide range of natural wavelengths are recorded partially in each of the layers in an amplitude recording, the use of phase recording by interference against a reference or carrier wave allows us to ensure that one specific, chosen image component can advantageously be entirely restricted to recording in one or other of the two, or three, or more individual recording layers in the volume hologram.

Now, because the individual planar fringe structures, which are fundamentally responsible for monochromatic diffraction, are so seriously damaged in their function by the overcrowding effect shown in FIG. 5, the method described here allows us to separate them entirely and thus create compound volume holograms which are able to show exceptional diffraction efficiency in each color component.

Since our ability to record a pair of fringe structures at a high level of efficiency has been previously demonstrated, we have shown that it is the addition of a third diffractive structure to a single recording layer which is the most problematic phenomenon. For this reason, it is felt that we need in most cases to separate the layer into two photosensitive components only to achieve high total diffraction efficiency in all three colors. Whereas it may appear to be the most elegant solution to divide each coating into three components, there are practical considerations which present the advantages of a two-fold separation.

For example the overall thickness of the emulsion is an important factor in the determination of its maximum possible diffraction efficiency, since the more planes of fringes in the form of index modulated layers in the hologram, the more efficiently it is expected to reflect incident light. This is tempered by the influence of our ability to control the level of index modulation within the individual fringes, since a higher index modulation will result in more reflectivity per fringe interface. Conversely, a thicker stack of fringes, whilst increasing the overall reflectivity, will tend to cause the creation of a narrower peak of frequencies of reflectivity, or wavelength selectivity, accompanied by an increase in the directional selectivity of the device.

However, there are practical limits to the increasing dimensions of a coated gelatin emulsion in terms of the physical properties of the layer, its handling properties, processing and drying capability. Agfa Gevaert, Ilford, Slavich, Fuji Hunt and the like, have elected to coat their products at about 8 microns of thickness. Selecting a twin separation of color components enables us to produce a layer of similar thickness with two component parts each of a thickness which we have demonstrated in recent practical tests to be capable of high brightness for a graphic image hologram illuminated in ordinary room lighting.

In addition to the unsatisfactory overload of the actual index modulation itself, in the case of silver halide, we have an effect due to the limited "maximum density ("Dmax")" of a developed silver recording. When all of the film is dedicated to the recording of a single image we ensure that all of the silver utilized in development is effectively dedicated to the production of diffractive capability related to that particular image feature. It is therefore to be expected that this will enhance the diffraction efficiency of that image rather than sharing its silver transfer chemistry facilities with another independent image feature.

Similar restrictions apply to the dilution of the chemical potential of the photopolymer reaction. The exposure of the film to actinic laser illumination causes migration of monomer species into the areas which will be rendered high index zones. Dilution of the quantity of material associated with each individual diffractive fringe zone associated with each image component will lower the index modulation and cause the hologram brightness to suffer.

Whereas a silver halide recording material can essentially be exposed consecutively to the component colors—there may be a need with certain photopolymer materials to record the components simultaneously since polymerization reaction is concurrent with the light exposure, rather than waiting for a chemical processing stage, and one can imagine that it may be advantageous for that reason to expose the color components simultaneously with properly balanced intensity of the component laser beams.

Figure 7:
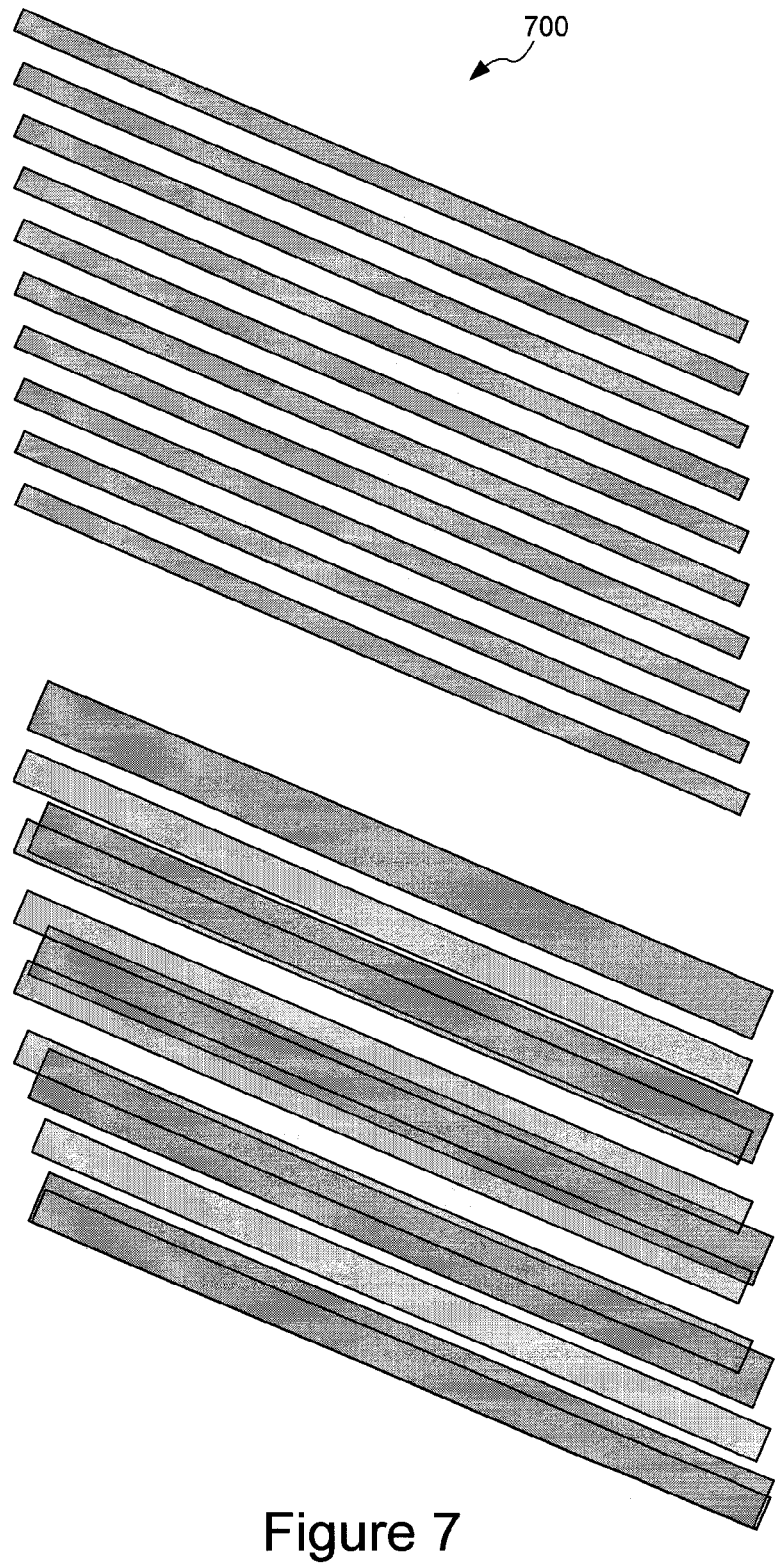
FIG. 7 shows a schematic diagram of fringe structures in an embodiment of holographic film according to the invention storing a volume hologram.

FIG. 7 shows a configuration 700 where a twin sensitized layer allows image light for the blue hologram component recorded at 491 nm to record its fringe structure predominantly in the upper part of the coating. The lower part of the emulsion is sensitized to the red and yellow part of the visible spectrum, and this allows both the 633 nm laser and the 561 nm laser to record their information therein. Whilst there is some limited sensitivity by the red/yellow sensitized emulsion layer toward the 491 nm laser, it is generally accepted that "raw" silver bromide sensitivity to blue ends in the region 500-520 nm. Thus, in the low exposure time necessary to facilitate a strong recording in the spectrally sensitized recordings, there is little or no image in the unsensitized emulsion from the 491 nm laser, which is normally more active as regards the "green" sensitizer in typical commercial holographic films. In order to ensure that the fringe structures are entirely separated, there remains the option of the use of a 514 nm argon ion or d.p.s.s. laser, itself non-actinic as far as the yellow sensitizer is concerned.

Thus we have described a simple method for separating, in a single film medium made by ordinary coating technology, a fringe structure associated with holograms of multiple colors, so as to allow maximum diffraction efficiency, commensurate with a hologram used for security purposes to be viewed in ambient lighting conditions.

In conclusion, the invention provides novel systems, devices, methods and arrangements for holographic film and recording. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A holographic film for recording a multicolor volume hologram, the film comprising:
    a carrier;
    a first photosensitive recording layer sensitive to one or both of red and green laser light; and
    a second photosensitive recording layer sensitive to blue laser light, wherein the first and second photosensitive recording layers each are translucent to said blue laser light and said one or both of red and green laser light to allow fringe structures defined by phase modulation to be recorded independently in said first and second photosensitive recording layers.

2. A holographic film as claimed in claim 1 wherein both said first and said second photosensitive recording layers comprise photopolymer recording material.

3. A holographic film as claimed in claim 1 wherein both said first and said second photosensitive recording layers comprise silver halide and have a grain size of less than 30 nm, and wherein at least one of said first and second photosensitive recording layers has a thickness of greater than 3 μm and less than 5 μm.

4. A holographic film as claimed in claim 1 wherein both said first and said second photosensitive recording layers comprise silver halide and have a grain size of less than 30 nm.

5. A holographic film as claimed in claim 1 wherein one or both of said first and second photosensitive recording layers has a thickness of less than 5 μm.

6. A holographic film as claimed in claim 1 wherein said first and second photosensitive recording layers are transparent to said blue laser light and said one or both of red and green laser light.

7. A method of recording a multicolour image into a volume hologram in a holographic film, the method comprising:
    providing a carrier;
    providing a first photosensitive recording layer sensitive to one or both of red and green laser light;
    providing a second photosensitive recording layer sensitive to blue laser light;
    wherein the first and second photosensitive recording layers each are translucent or transparent to said blue laser light and said one or both of red and green laser light to allow fringe structures defined by phase modulation to be recorded independently in said first and second photosensitive recording layers; and recording a first fringe structure defined by phase modulation in said first photosensitive recording layer using one or both of said red and green laser light; and recording a second fringe structure defined by phase modulation in said second photosensitive recording layer using said blue laser light;

wherein the colour components of said multicolour image are recorded simultaneously by simultaneously illuminating the film with said blue laser light and said one or both of said red and green laser light.

8. A method of manufacturing the holographic film for recording a multicolor volume hologram, the method comprising:

providing a carrier;

depositing onto said carrier a first photosensitive recording layer sensitive to one or both of red and green laser light; and depositing onto said carrier a second photosensitive recording layer sensitive to blue laser light;

wherein the first and second photosensitive recording layers each are translucent or transparent to said blue laser light and said one or both of red and green laser light to allow fringe structures defined by phase modulation to be recorded independently in said first and second photosensitive recording layers.

\* \* \* \* \*